(12) United States Patent
Sabhapathy (10) Patent No.: US 9,528,388 B2
(45) Date of Patent: Dec. 27, 2016

(54) METHOD AND SYSTEM TO PREVENT EQUIPMENT CORROSION FROM HUMID AMBIENT AIR ENTRY INTO AN OFFSHORE WIND TURBINE

(71) Applicant: Gamesa Innovation & Technology, S.L., Sarriguren (Navarra) (ES)

(72) Inventor: Peri Sabhapathy, Sarriguren (ES)

(73) Assignee: ADWEN OFFSHORE, S.L., Zamudio (Bizkaia) (ES)

( * ) Notice: Subject to any disclaimer, the term of this patent is extended or adjusted under 35 U.S.C. 154(b) by 799 days.

(21) Appl. No.: 13/901,091

(22) Filed: May 23, 2013

(65) Prior Publication Data

US 2013/0323035 A1 Dec. 5, 2013

(30) Foreign Application Priority Data

May 31, 2012 (EP) .................................... 12004208

(51) Int. Cl.
*F03B 11/02* (2006.01)
*F01D 25/00* (2006.01)

(52) U.S. Cl.
CPC ............. *F01D 25/007* (2013.01); *F03D 80/00* (2016.05); *F05B 2240/14* (2013.01); *F05B 2240/57* (2013.01); *F05B 2260/64* (2013.01); *F05B 2260/95* (2013.01); *Y02E 10/722* (2013.01); *Y02E 10/726* (2013.01)

(58) Field of Classification Search
CPC .... F01D 25/007; F03D 1/0658; F03D 1/0666; F03D 11/00; F05B 2260/64; F05B 2260/95; F05B 2240/14; F05B 2240/912; B64C 7/00; B64C 7/02
See application file for complete search history.

(56) References Cited

U.S. PATENT DOCUMENTS

| 7,837,442 B2 * | 11/2010 | Kirtley ................. F03D 1/0608 416/132 B |
| 2011/0001371 A1 * | 1/2011 | Landeta Manzano . B01D 45/08 310/58 |
| 2011/0142636 A1 * | 6/2011 | Curtin ................... F03D 1/0658 416/62 |

* cited by examiner

*Primary Examiner* — Craig Kim
*Assistant Examiner* — Jason Fountain
(74) *Attorney, Agent, or Firm* — Ladas & Parry LLP (57) ABSTRACT

A method and system to prevent the equipment corrosion in an offshore wind turbine by minimizing the humid ambient air entry into the turbine. The method uses the fact that the ambient air entry into or the inside air leakage out of the turbine can be minimized by lowering the air pressure difference across the outside and inside faces of the seals. The proposed system includes a slotted, streamlined plenum over each of these interfaces that helps moderate the air pressure on the outside of the seals. On the inside, the air pressure over the seals is controlled by a variable air flow resistance system that consists of two circular, coaxial perforated plates that can rotate relative to each other.

15 Claims, 7 Drawing Sheets

Fig. 6b (fully open to air flow)

Fig. 6d (fully closed to air flow)

Fig. 6a (isometric view)

Fig. 6c (partly open to air flow)

Fig. 7

METHOD AND SYSTEM TO PREVENT EQUIPMENT CORROSION FROM HUMID AMBIENT AIR ENTRY INTO AN OFFSHORE WIND TURBINE

FIELD OF THE INVENTION

The present invention generally relates to wind turbines, and, more particularly, to a method and system to prevent equipment corrosion in the offshore wind turbines.

BACKGROUND OF THE DISCLOSURE

A wind turbine converts the kinetic energy of the wind into electrical energy through its rotor, drive train, electrical generator and converter. An electrical transformer converts the low voltage output from the converter into a high voltage output before it is sent to the substation at the wind farm. During the operation of the wind turbine, these major components and subsystems of the wind turbine dissipate a significant amount of heat to the surrounding air. So the clean, low humidity air inside the nacelle, where these components and the subsystems are mostly housed, has to be continuously either cooled and re-circulated (a closed air flow system) or replaced by fresh, clean, cooler, low humidity air (an open air flow system).

When the relative humidity (RH) of the surrounding air is high, the equipment corrosion rate is significant and it increases exponentially when the RH of the air is above about 65%. The equipment corrosion is exasperated by the presence of any water droplets and salt particles in the air. In the case of a wind turbine cooled with an open cooling air flow system, the equipment corrosion can be minimized by ensuring that the wind turbine is sealed except for the dedicated air inlets and outlets, and that the cooling air entering the wind turbine is clean (free of water droplets, dust and salt particles) and has a RH that is below the acceptable limit. The RH of the cooling air entering the wind turbine can be lowered either by heating it and or by dehumidification. As the cooling air flows through the nacelle from the air inlet to the outlet, its temperature continually increases and the RH correspondingly decreases because of the heat dissipation from the various components and subsystems in the nacelle. The sealing of the wind turbine helps prevent the unwanted high humidity ambient air entering the wind turbine and thus increasing the RH of the cooling air flowing through the nacelle. This helps minimize the equipment corrosion.

While the turbine is operating, the nacelle to rotor, the blade to rotor and the nacelle to tower interfaces move relative to each other. The rotor rotates with respect to the nacelle to generate the power from the wind. To generate optimum power, the wind turbine blades are adjusted, up and down, according to the wind speed. This adjustment comes from turning the each of the blades along its longitudinal axis (to pitch). Moreover, the nacelle is continuously yawed (rotated along a vertical axis) to ensure that the rotor is correctly oriented towards the wind direction. And all these interfaces typically contain dynamic seals to prevent the ambient air entry into the wind turbine or the clean air leakage out of the wind turbine. On the inside, the seals are exposed to the air that is inside the nacelle or the rotor. And on the outside the seals are exposed to the ambient air. It is well known that when air flows around a bluff body such as a cylinder, the air pressure along its surface varies significantly. A number of factors such as the dynamic loads on the sealing surfaces and the temperature variations and fluctuations affect the shape, the structure and thus the sealing ability of the seals. This results in either the ambient air entering the wind turbine or the air inside the wind turbine leaking out. Any humid ambient air into the wind turbine increases the chances of equipment corrosion.

The prior art on the corrosion control of the equipment inside an offshore wind turbine mainly consists of the use of dehumidifiers inside the wind turbine, corrosion inhibiting coating of the equipment, and cooling and recirculation of the clean, low humidity air inside the wind turbine and augmenting it with clean, low humidity ambient air. They do not specifically address the issue of the humid ambient air entry into the wind turbine or the clean air leakage out of the wind turbine through the dynamic interfaces.

While various other methods and systems have been developed in the past for preventing corrosion in the offshore wind turbines, there is still room for development. Thus a need persists for further contributions in this area of technology.

SUMMARY OF THE DISCLOSURE

The above-mentioned shortcomings, disadvantages and problems are addressed herein which will be understood by reading and understanding the following specification.

The present invention is directed to a method and system to minimize the humid ambient air entry into a nacelle of a wind turbine or the nacelle air leakage out. The system specifically proposes a way to augment the sealing of the nacelle to the tower, the nacelle to the rotor and the rotor to a plurality of blades interfaces of the wind turbine so that the humid ambient air entry into the wind turbine or the air leakage out of the wind turbine is minimized. The proposed method uses the fact that the ambient air entry into the wind turbine or the nacelle air leakage out of the wind turbine can be minimized by lowering the air pressure difference across the outside and inside faces of the seals. The proposed system consists of a slotted, streamlined, aerodynamic plenum over each of these interfaces that helps moderate the air pressure on the outside of the seals. On the inside, the air pressure over the seals is dynamically controlled by a variable air flow resistance system that consists of two circular, coaxial perforated plates that can rotate relative to each other. The system can thus be designed so that the air pressure difference across the seals is small and thus the ambient air entry into the turbine or the clean air leakage out of the turbine is minimized at all times.

Others will become apparent to those skilled in the art upon consideration of the following detailed description of the illustrative embodiments exemplifying the best mode of carrying out the invention as presently perceived.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

The present invention is directed to a method and system to minimize the humid ambient air entry into a nacelle of a wind turbine or the nacelle air leakage out. The system specifically proposes a way to augment the sealing of the nacelle to tower, the nacelle to rotor and the rotor to a plurality of blades interfaces of the wind turbine so that the humid ambient air entry into the wind turbine or the air leakage out of the wind turbine is minimized. The proposed method uses the fact that the ambient air entry into the wind turbine or the nacelle air leakage out of the wind turbine can be minimized by lowering the air pressure difference across the outside and inside faces of the seals. The proposed system consists of a slotted, streamlined, aerodynamic plenum over each of these interfaces that helps moderate the air pressure on the outside of the seals. On the inside, the air pressure over the seals is dynamically controlled by a variable air flow resistance system that consists of two circular, coaxial perforated plates that can rotate relative to each other. The system can thus be designed so that the air pressure difference across the seals is small and thus the ambient air entry into the turbine or the clean air leakage out of the turbine is minimized at all times.

Figure 1:
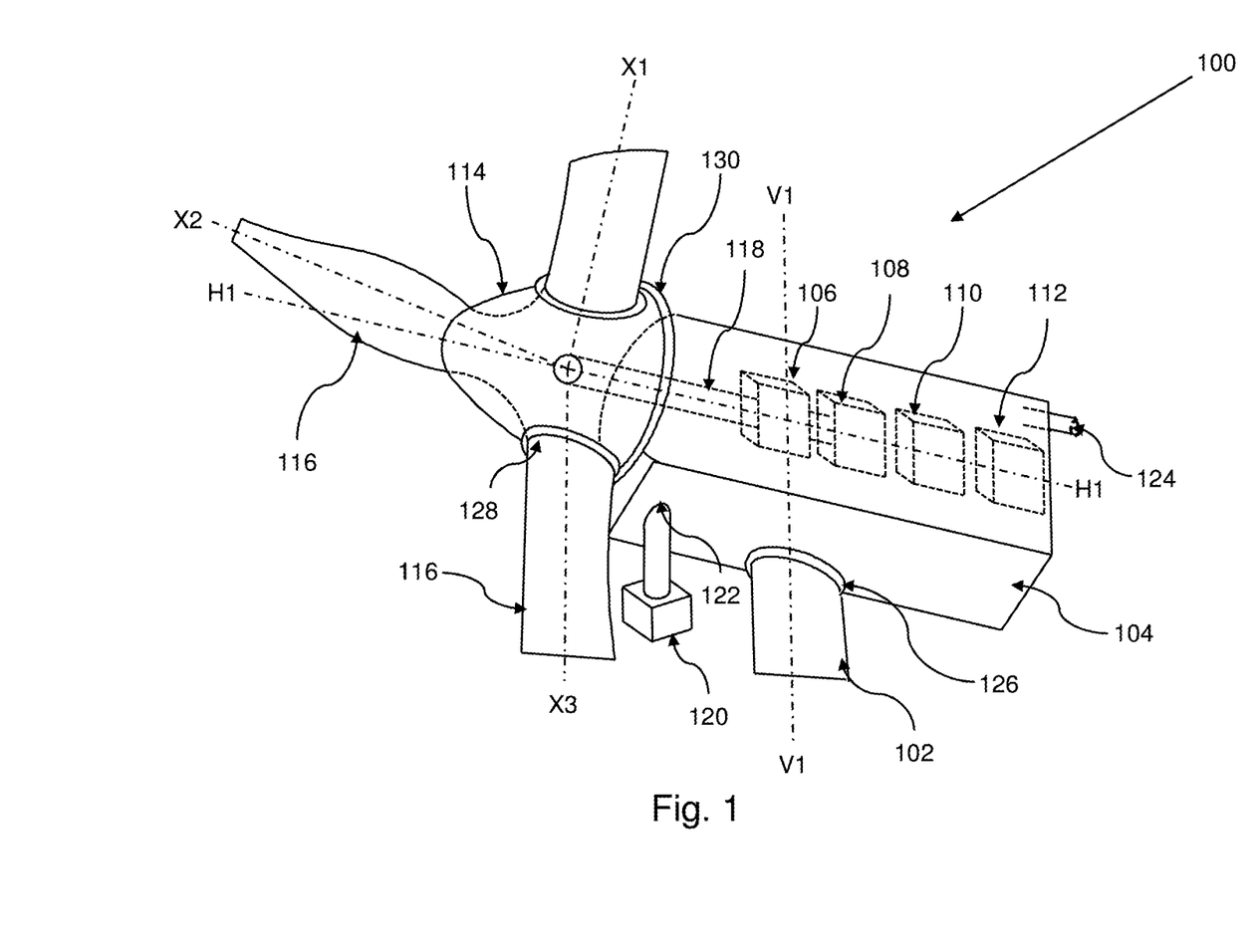
FIG. 1 shows a schematic view of a horizontal axis wind turbine.

FIG. 1 shows a schematic view of a typical horizontal axis wind turbine 100 according to an embodiment of the disclosure. The wind turbine 100 includes a tower 102 and a nacelle 104 mounted on top of the tower 102. The nacelle 104 houses the major components and sub-systems of the turbine such as a drive train 106, a generator 108, a converter 110 and a transformer 112. The front of the nacelle 104 supports a rotor 114 that holds one or more blades 116. As the blades 116 turn due to the wind, the rotor 114 rotates in relation to the nacelle 104 along a nearly horizontal axis H1-H1. The rotor hub is attached to main shaft 118 which turns the electrical generator 108 typically through the drive train 106. The converter 110 conditions the electrical output from the generator 108 to match the frequency and other requirements of the electrical power grid. The electrical transformer 112 converts the low voltage output from the converter 110 into a high voltage output before it is sent to the substation at the wind farm. An anemometer (not shown in the figure) that measures the wind speed in the vicinity and an anemoscope (not shown) that measures the wind direction are disposed at appropriate locations of the outer peripheral surface (for example, at the top, etc.) of the nacelle 104.

In the wind turbine 100, the yaw bearings between the tower 102 and the nacelle 104 permit the nacelle 104 to rotate along the vertical axis V1-V1 so that the rotor 114 can be oriented towards the wind, and, thus the wind turbine energy production can be maximized. Each of the rotor blades 116 is attached to the rotor hub 114 through bearings that permit the pitching of the blade 116 along its axis, X1, X2 or X3.

The wind turbine 100 further includes an air treatment unit 120 as shown in FIG. 1. The air treatment unit 120 can be present outside the nacelle 104. The air treatment unit 120 pulls in the ambient air and removes the water droplets, salt and dust particles from the ambient air, lowers the relative humidity (RH) either by dehumidification and/or heating, and blows the clean, low relative humidity air into the nacelle 104 through the air inlet 122 at the nacelle front bottom. As the air flows through the nacelle 104 from the front to the back, the air picks up the heat dissipated by the various components and sub-systems. Finally, the hot air exits the nacelle 104 through one or more air outlets 124 in the rear of the nacelle 104. For a given air flow rate through the nacelle, the air pressure inside the nacelle 104 depends on the overall system flow resistance, and, moreover, the air pressure decreases from the air inlet 122 to the air outlet 124.

The wind turbine 100 further includes dynamic seals at various interfaces in the wind turbine 100 as shown in FIG. 1. The dynamic seals include a nacelle-tower seal 126 present at the nacelle 104 and the tower 102 interface, rotor-blade seals 128 present at the rotor 114 and the blades 116 interface and a nacelle-rotor seal 130 present at the nacelle 104 and the rotor 114 interface. The dynamic seals are provided in order to prevent the ambient air entry into the wind turbine 100 or the air inside the wind turbine 100 leaking out. On the inside, the seals 126, 128 and 130 are exposed to the air that is inside the nacelle 104 or the rotor 114. And on the outside the seals 126, 128 and 130 are exposed to the ambient air.

There are a number of factors such as the dynamic loads on the sealing surfaces and the seals 126, 128 and 130 may cause minor gaps to form between the seals 126, 128 and 130 and their respective sealing surfaces. The gap sizes can change over the life of the wind turbine 100. This results in either the ambient air entering the turbine or the air inside the wind turbine leaking out. Any humid ambient air entry into the wind turbine 100 increases the chances of equipment corrosion. The larger the air pressure difference between the outer and inner faces of the seals 126, 128 and 130, the more pronounced is the ambient air entry into the wind turbine 100 or the air leakage out of the wind turbine 100. Since the tower 102 is of circular cross section, the air flow due to the wind over the tower 102 near the nacelle-tower seal 126 is similar to that of the cross flow of air over a circular cylinder as discussed in books on aerodynamics and fluid mechanics. The air pressure around the outer surface of the tower 102, and, thus, the air pressure on the outer faces of the seals varies significantly. The air pressure is of the highest value at the stagnation point and the lowest away from the stagnation point. The magnitudes of these high and low air pressures on the tower outer surface increase with the wind speed. If there are any gaps in the seals 126, 128 and 130, the ambient air will leak into the nacelle 104 through the gaps unless the inside air pressure is higher than the air pressure at the seal outer face. At the locations where the outside air pressure over the seal is lower than the air pressure inside the nacelle, the air will leak out of the nacelle. This air leakage will be more pronounced when the air pressure difference between the inside and outside seal faces is large.

The ambient air entry into the nacelle 104 can be prevented by always keeping the nacelle 104 internal air pressure to be higher than the highest outside air pressure on the nacelle-tower seal 126 at the maximum wind speed. However, at the nacelle-tower seal 126 locations where the outside air pressure is low, this will result in a significant leakage of clean, low humidity air, meant for cooling the equipment inside the nacelle, from inside the nacelle to the outside ambient. This will result in over sizing the air treatment unit 10 accompanied by increased power to operate it. Moreover, it'll also require the strengthening of the nacelle cover to withstand the high nacelle internal air pressure.

Figure 2:
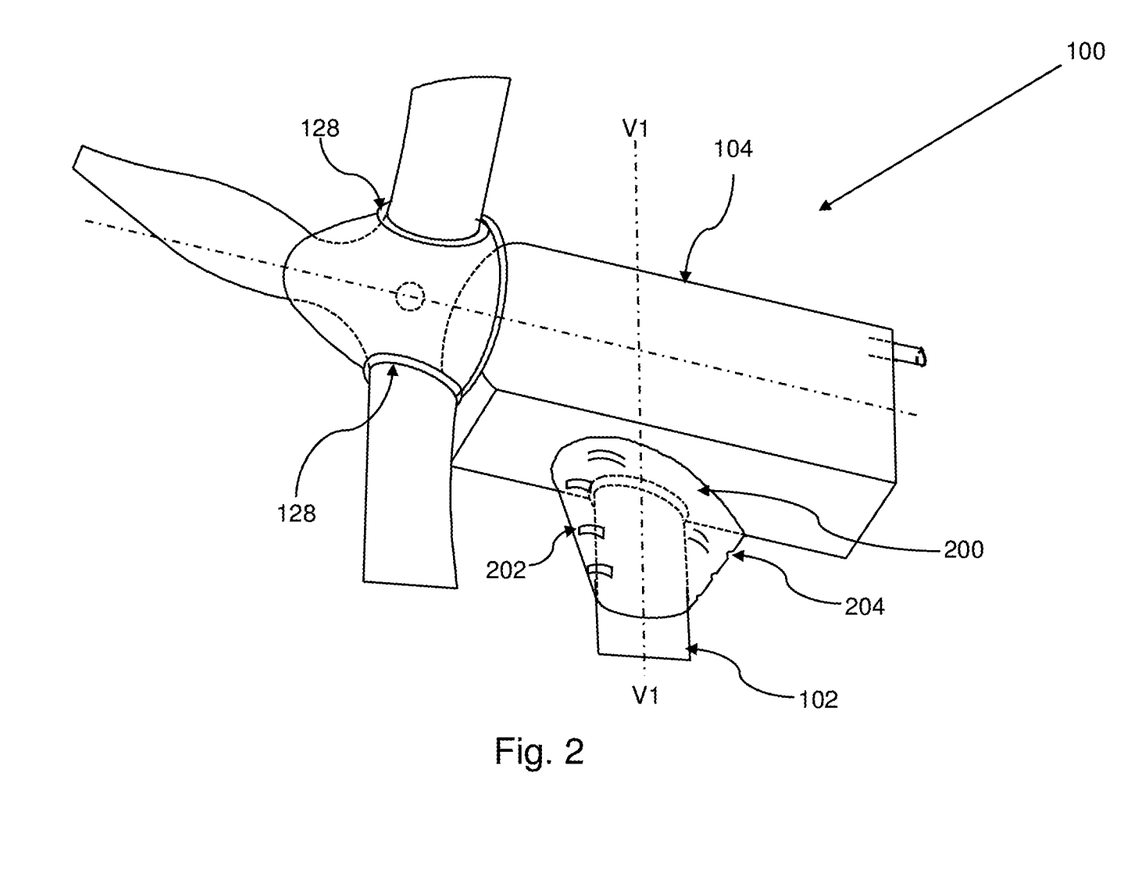
FIG. 2 shows a perspective view of a proposed slotted plenum that lowers the pressure variation along the outer face of the dynamic seal at the nacelle-tower interface according to an embodiment of the disclosure.
Figure 3:
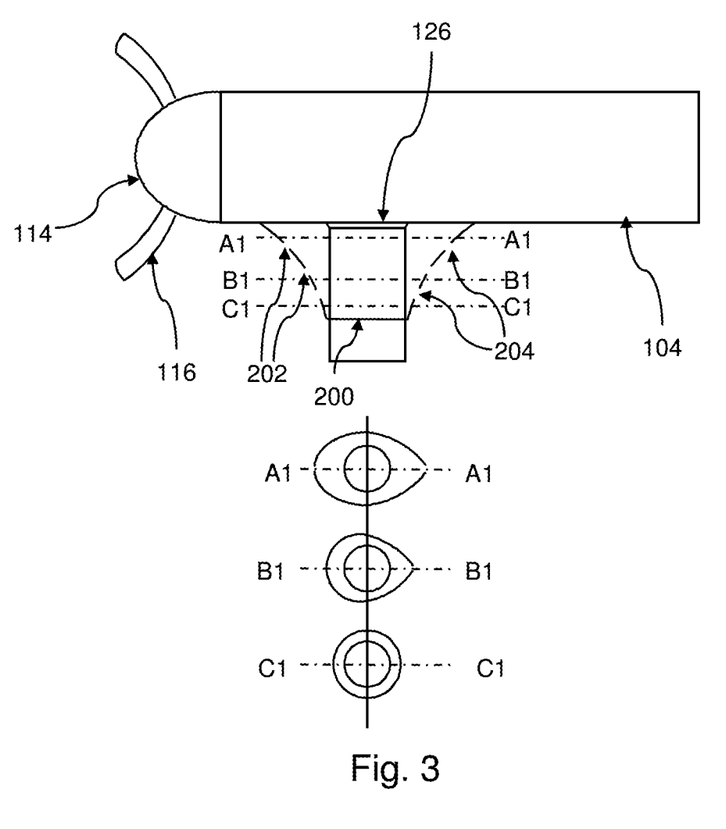
FIG. 3 is a side view of the slotted plenum shown in the embodiment of FIG. 2.

FIG. 2 shows a perspective view of a proposed plenum system that helps eliminate the pressure variation on the outside face of the seal along its circumference. The system is also configured to keep the nacelle air overpressure low. The system consists of a truncated inverted cone shaped plenum 200 or a first plenum 200 that covers the nacelle-tower seal 126 of the nacelle-tower interface. The first plenum top is attached to the nacelle bottom, and, therefore, it yaws with the nacelle 104. At the proximal end of nacelle 104, the horizontal section of the first plenum 200 is similar to a symmetric airfoil with the leading edge directed towards nacelle front. The distal end of the nacelle 104, the first plenum 200 slowly tapers towards the tower as shown in sectional views in the FIG. 3 along the horizontal axis A1-A1, B1-B1 and C1-C1. The first plenum 200 becomes circular at the bottom when it approaches the tower 102 as shown along the axis C1-C1. The small gap at the plenum bottom between the first plenum 200 and the tower 102 permits the relative motion between the tower 102 and the first plenum 200. The first plenum 200 further contains a plurality of inlet slots 202 at the front facing the wind and a plurality of outlet slots 204 at the back facing away from the wind. Thus, the inlet slots 202 at the stagnation points permit the ambient air to enter into the first plenum 200, and, the outlet slots 204 at the opposite end allow the air to escape from the first plenum 200. Since these slots act as orifices, as the air enters the first plenum 200 through the stagnation points, there is an air pressure drop. Similarly as the air exits the first plenum 200 through the outlet slots 204 in the back there will be air pressure drop across the slots. Thus the air pressure inside the first plenum 200 will be in between the high and low pressures over the plenum arising from the external airflow over the first plenum 200. Thus, the proposed system helps to maintain the air pressure on the outside faces of the nacelle-tower seal 126 at an intermediate value between the high and low pressures encountered for air flow over the tower 102. Any water droplets that enter the first plenum 200 will drain out through the bottom at the interface between the plenum and the tower. In another example, an additional slot (not shown) for water drainage can also be made on the back side of the first plenum bottom near the plenum-tower interface.

Figure 4:
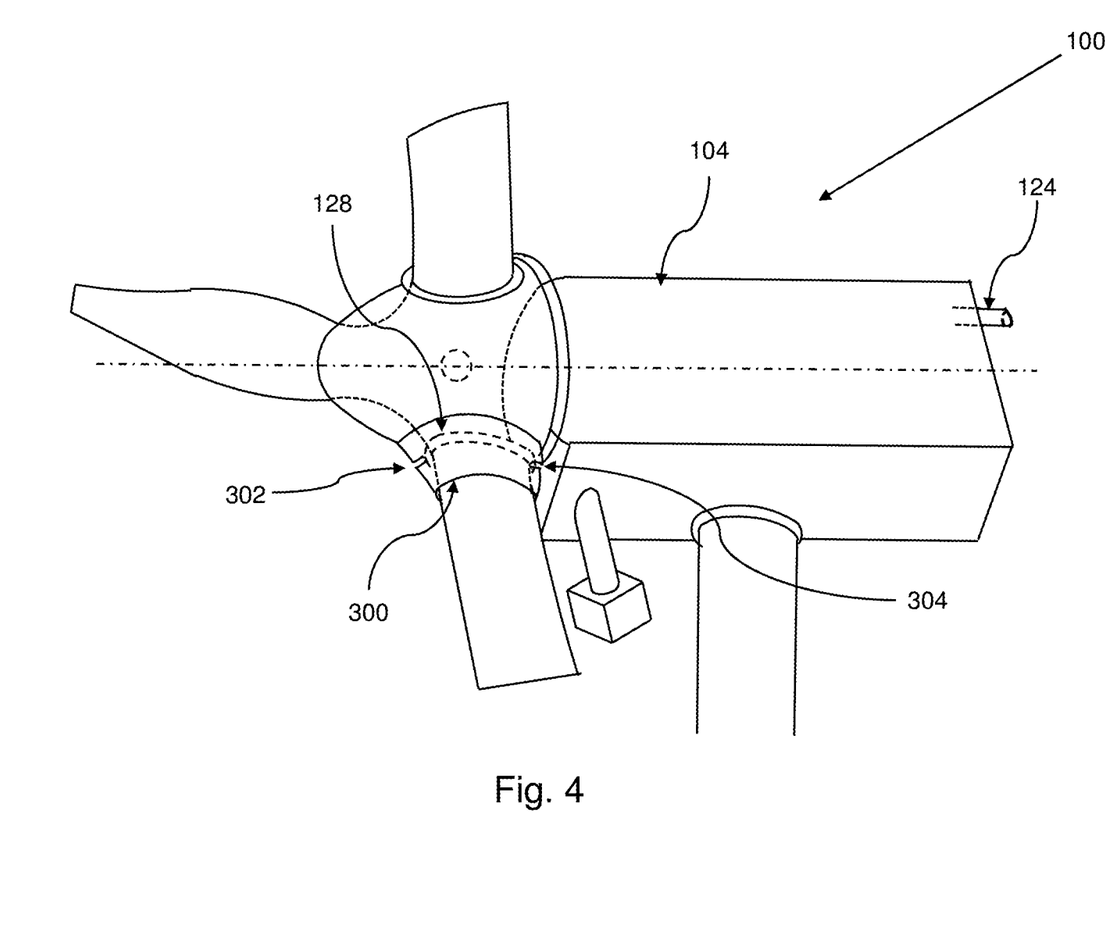
FIG. 4 shows a perspective view of a proposed slotted plenum that lowers the pressure variation along the outer face of the dynamic seal at the rotor-blade interfaces according to another embodiment of the disclosure.

FIG. 4 shows the proposed streamlined, aerodynamic slotted plenum system 300 or the second plenum 300 for the rotor-blade seal 128 at the rotor-blades interface. The larger, streamlined, aerodynamic end of the second plenum 300 (with the leading edge facing the wind) is attached to the rotor 114. And at the other narrower, circular end, the second plenum 300 permits the relative motion of the circular cylindrical blade root and thus allowing the pitching of the blades 116. As in the case of the first plenum 200 over the nacelle-tower seal 126, the second plenum 300 at the rotor-blade seal 128 has inlet slots 302 at the stagnation points for air entry into the second plenum 300 and outlet slots 304 at the opposite end for air exit out of the second plenum 300. As described before for the first plenum, the air flow through the second plenum 300 over the rotor-blade seal 128 helps keep air pressure inside the second plenum 300 to be in between the high and low air pressures on the outside of the second plenum 300. As a result, the air pressure on outer face of the rotor-blade seal 128 is nearly uniform and is nearly at the atmospheric pressure at all wind speeds.

Figure 5:
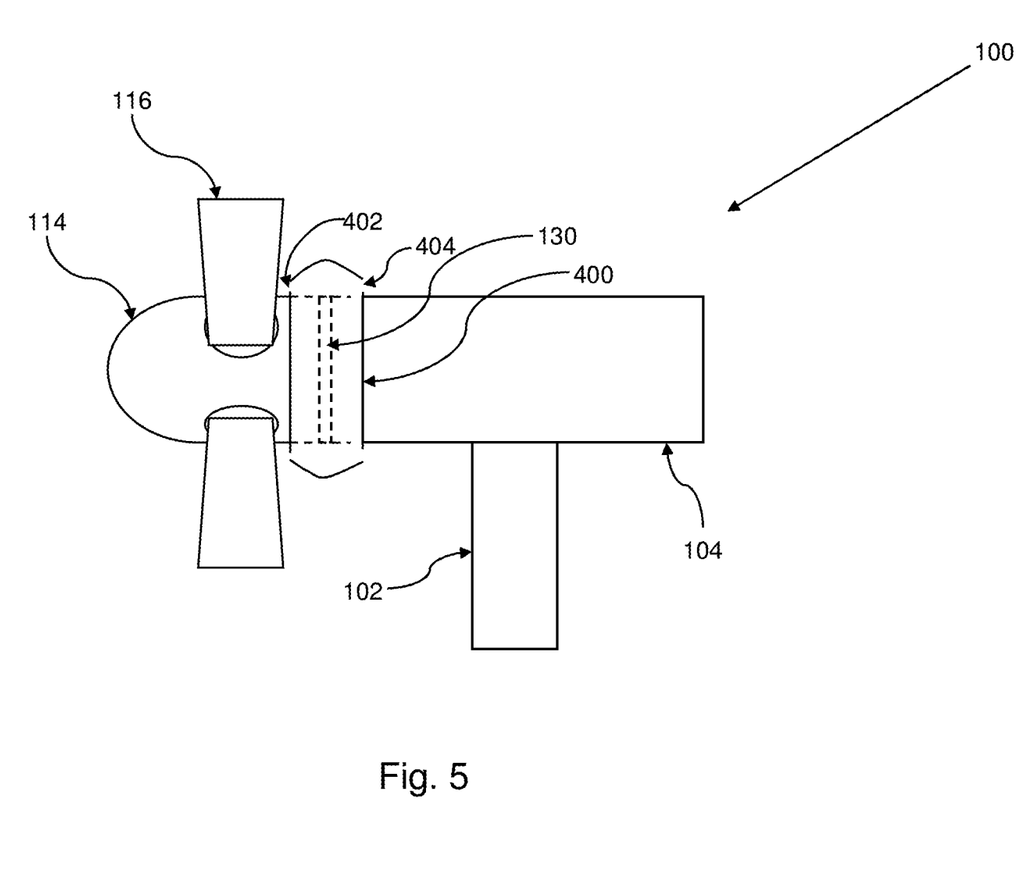
FIG. 5 shows a side view of a proposed slotted plenum that lowers the pressure variation along the outer face of the dynamic seal at the nacelle-rotor interface according to another embodiment of the disclosure.

At the nacelle-rotor interface 130, the pressure variation across its circumference is typically not as significant as that at the nacelle-tower seal 126 or at the rotor-blade seal 128. However, as shown in previous examples, a third plenum 400 with air inflow and outflow can be employed for the nacelle-rotor seal 130 as well to keep the pressure over the outer face of the nacelle-rotor seal 130 to be uniform and nearly constant as shown in a side view of the wind turbine 100 in FIG. 5. The plenum 400 is attached to the rotor 114 at one end and it freely rotates over the nacelle 104 at the other end. In this case air flow into the third plenum 400 is through inlet slots 402 in the small protrusions that are circumferentially placed around the plenum periphery. Instead of dedicated slots for air exit from the plenum, the rear gap 404 between the third plenum 400 and the nacelle 104 allows the air to exit the third plenum 400.

The proposed plenum system with air inflow and outflow helps maintain a nearly uniform, constant pressure over the outer faces of the seals at the nacelle-tower, rotor-blade and nacelle-rotor interfaces at all wind speeds. Moreover, the pressure on the outer seal faces is nearly equal to that of the atmospheric pressure.

Figure 6A:
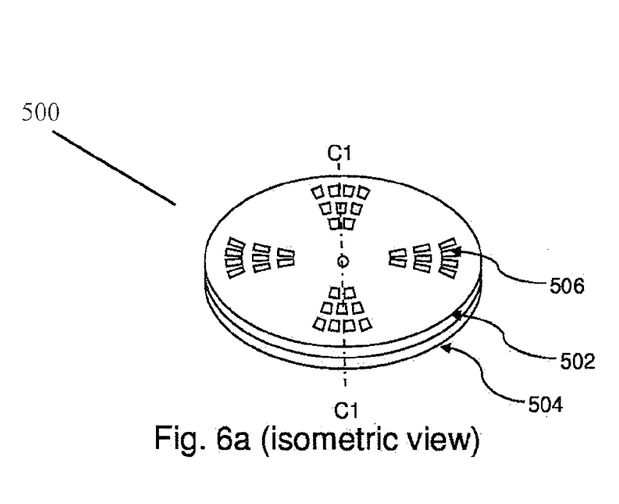
FIG. 6a-6d shows a proposed variable air flow resistance device having coaxial, circular, dual perforated plates present at the nacelle air outlet of the wind turbine of FIG. 1.
Figure 6B:
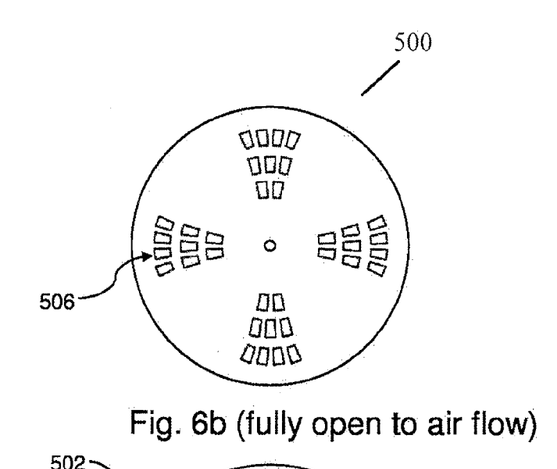
Figure 6C:
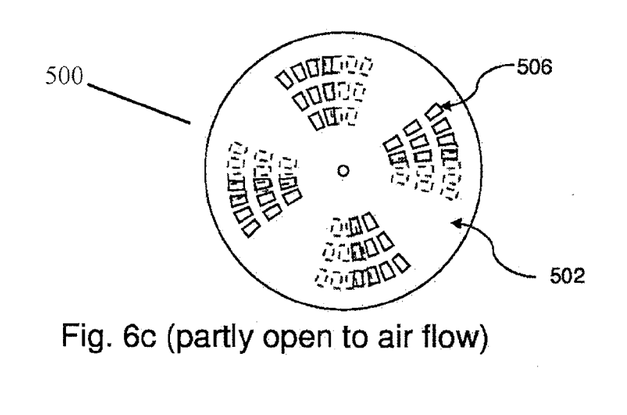
Figure 6D:
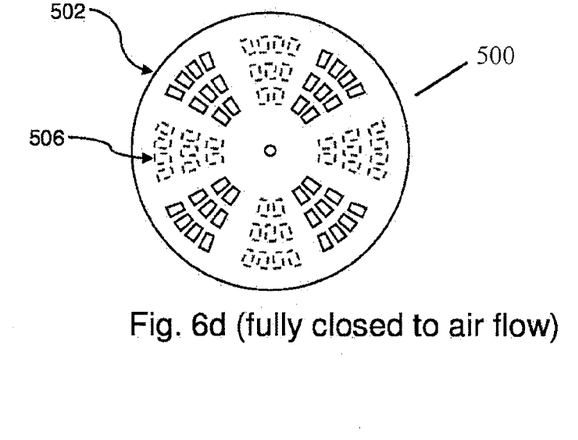

As indicated earlier, the air pressure on the inner faces of the seals 126, 128 and 130 depends on the air flow through the nacelle 104 and the overall system air flow resistance. For a given cooling air flow through the nacelle 104, the air pressure on the inner seal faces can be maintained to the desired value using a variable air flow resistance device 500. The variable air flow resistance device 500 includes two circular coaxial perforated plates 502 and 504 that can rotate relative to each other along a vertical axis C1-C1. These perforated plates 502 and 504 are shown in FIGS. 6a to 6d. The perforated plates 502 and 504 are located at the nacelle air outlet 124 of FIG. 1. The two perforated plates 502 and 504 are identical to each other and are positioned such that one is on top of the other as shown in FIG. 6a. The top plate 502 can rotate along the common vertical axis C1-C1. Both plates have circular segmented holes 506. The bottom plate 502 is stationary. By rotating the top plate 502 with respect to the bottom plate 504, the outlet open area for the air flow can be adjusted, thus varying the resistance to the air flow through the plates as shown in FIGS. 6b, 6c and 6d. Thus the air pressure inside the nacelle 104, and, thereby, the air pressure on the inside faces of the seal 126, 128 and 130 present at the nacelle-tower interface, nacelle-rotor interface and the rotor-blades interface can be dynamically adjusted to the desired value. Thus, the air pressure on the inside faces of the seals 126, 128 and 130 can be dynamically adjusted to be slightly higher than that on the outer faces of the seals 126, 128 and 130. The two perforated plates 502 and 504 are normally controlled by a control system.

Figure 7:
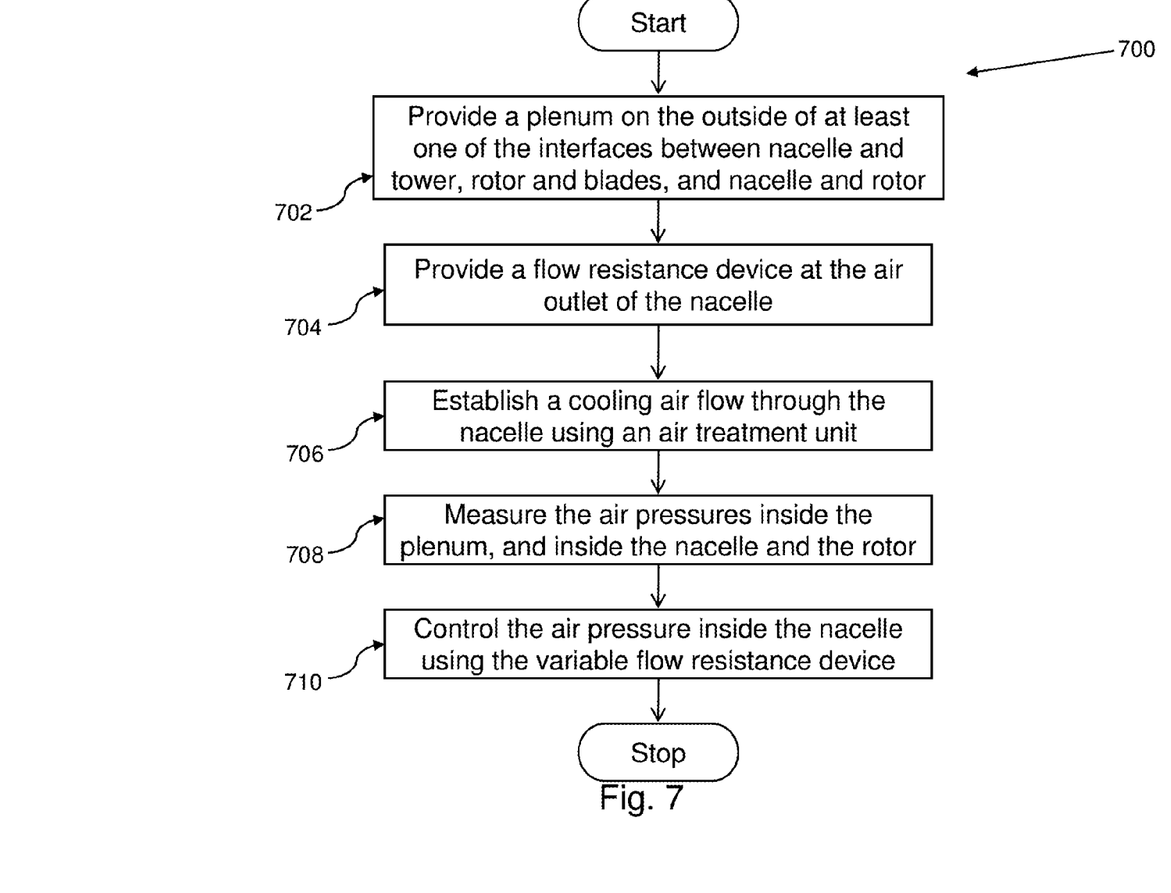
FIG. 7 is a flowchart illustrating the steps involved in a method of preventing corrosion inside the wind turbine described in FIG. 1.

FIG. 7 shows a flowchart 700 illustrating the steps involved in a method of preventing corrosion inside the wind turbine 100. At step 702, at least one of the plenums 200, 300 and 400 is provided over the outer side of at least one of the joints between the nacelle 104 and the tower 102, the rotor 114 and the plurality of blades 116, and the nacelle 104 and the rotor 114. At step 704, a variable flow resistance device 500 comprising two coaxial, circular perforated plates 502 and 504 is provided at the outlet 124 of the cooling air flow through the nacelle 104. At step 706, a clean, low humidity, air flow through the nacelle needed to cool the components inside the nacelle is established using the air treatment unit 120, the air inlet 122 and the air outlet 124. At step 708, the air pressures inside the above said plenums 200, 300 and 400, and the air pressures adjacent to the above said joints due to the cooling air flow inside the nacelle 104 and rotor 114 are measured. And, finally, at step 710, the position of the top perforated plate 502 of the above said variable flow resistance system 500 is adjusted so that the measured air pressures inside the nacelle 104 and rotor 114 due to the cooling air flow are slightly higher than the measured pressures inside the above said plenums 200, 300 and 400. Thus the humid ambient air entry into the nacelle 104 and the rotor 114 is prevented and the equipment corrosion inside the turbine is minimized.

It should be appreciated that the proposed method of maintaining the nacelle internal air over pressure is not specifically limited to the wind turbines that are cooled by an open air flow system where the clean, low humidity air enters the nacelle and the warm air exits the nacelle. The method is equally applicable to a turbine that is cooled by a closed air flow system or any other air flow system. In a turbine cooled by a closed air flow system, the air exiting through the perforated plates is cooled and re-circulated through the air inlet.

The proposed method and system thus helps keep the air pressure difference between the outer and inner faces of the dynamic seals at the nacelle to tower, rotor to blade and nacelle to rotor interfaces to be small and to the desired value. As a result, the ambient air leakage into the turbine is minimized. This helps lower the equipment corrosion and thus increase the life of the turbine. Though the proposed method and system is specifically directed to an offshore wind turbine, it can be used in any wind turbine where the relative humidity of the ambient air is high.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and various combinations of inventive aspects and principles are possible in light of the various embodiments provided above.

The invention claimed is:

1. A system for preventing corrosion in a wind turbine, the wind turbine having a tower, a nacelle mounted on the tower, a rotor attached to the nacelle and a plurality of blades attached to the rotor, the system comprising:
    an air treatment unit treating ambient air and supplying the treated air to the nacelle through an inlet in the nacelle, the nacelle further including an outlet for an outflow of warm air;
    a plenum present on an outer side of at least one joint between the nacelle and the rotor, the rotor and the plurality of blades, or the nacelle and the tower, the plenum having a plurality of inlet slots at a front facing the wind and a plurality of outlet slots at a back facing away from the wind, the plenum configured to modulate air pressure variations on the outer side of the at least one joint in such a way that there is no entry of ambient air inside the nacelle or exit of nacelle air into the environment; and
    a variable air flow resistance device present at the outlet of the nacelle, the air flow resistance device configured to maintain a higher air pressure within the nacelle with respect to the outside of the nacelle at the at least one joint.

2. The system of claim 1, wherein the plenum is configured to maintain the air pressure on the outer side of the at least one joint at an intermediate value between a highest pressure and a lowest pressure encountered for air flow over the tower.

3. The system of claim 1, wherein the plurality of inlet slots at the stagnation points permit the ambient air to enter into the plenum.

4. The system of claim 1, wherein the plurality of outlet slots allow the air to escape from the plenum.

5. The system of claim 1, wherein the air pressure is dropped when the ambient air passes from the plenum.

6. The system of claim 1, wherein the air flow resistance device includes two circular coaxial plates, the two circular plates configured to rotate respective of each other.

7. The system of claim 6, wherein the circular coaxial plates having slots for the outflow of warm air.

8. The system of claim 1, wherein the air treatment further includes at least one of a dehumidifying unit, a cooling unit and a purifying unit.

9. The system of claim 1, wherein the plurality of inlet slots and the outlet slots results in the air pressure drop in the plenum with respect to the ambient air.

10. The system of claim 1, further includes a control system configured to control the operation of the air flow resistance device.

11. A method of preventing corrosion in a wind turbine, the wind turbine having a tower, a nacelle mounted on the tower, a rotor attached to the nacelle and a plurality of blades attached to the rotor, the method comprising:
    establishing a treated air flow through the nacelle using an air treatment unit;

providing a plenum on an outer side of at least one joint between the nacelle and the rotor, the rotor and the plurality of blades, or the nacelle and the tower, the plenum configured to modulate air pressure variations on the outer side of the at least one joint in such a way that there is no entry of ambient air inside the nacelle or exit of nacelle air into the environment;

providing a variable air flow resistance device at an outlet of the nacelle;

controlling the flow of treated air in the nacelle using the variable air flow resistance device to maintain a higher pressure within the nacelle as compared to the pressure in the plenum.

12. A system for maintaining a pressure difference in a wind turbine, the wind turbine having a tower, a nacelle mounted on the tower, a rotor attached to the nacelle and a plurality of blades attached to the rotor, the system comprising:

an air treatment unit treating ambient air and supplying the treated air to the nacelle through an inlet in the nacelle, the nacelle further including an outlet for an outflow of warm air;

a plenum present on an outer side of at least one joint between the nacelle and the rotor, the rotor and the plurality of blades, or the nacelle and the tower, the plenum having a plurality of inlet slots at a front facing the wind and a plurality of outlet slots at a back facing away from the wind, the plenum configured to modulate air pressure variations on the outer side of the at least one joint in such a way that there is no entry of ambient air inside the nacelle or exit of nacelle air into the environment; and a variable air flow resistance device present at the outlet of the nacelle, the air flow resistance device configured to maintain a higher air pressure within the nacelle with respect to the outside of the nacelle at the at least one joint.

13. The system of claim 12, wherein the at least one joint is present between the nacelle and a rotor of the wind turbine, the rotor and a plurality of blades of the wind turbine, and the nacelle and a tower of the wind turbine.

14. The system of claim 12, wherein an inner side of the at least one joint has more pressure than the outer side of the at least one joint.

15. A wind turbine comprising:

a tower;

a nacelle mounted on the tower;

a rotor having a plurality of turbine blades rotatably supported by the nacelle;

an air treatment unit treating ambient air and supplying the treated air to the nacelle through an inlet in the nacelle, the nacelle further including an outlet for an outflow of warm air;

a plenum present on an outer side of at least one joint between the nacelle and the rotor, the rotor and the plurality of blades, or the nacelle and the tower, the plenum having a plurality of inlet slots at a front facing the wind and a plurality of outlet slots at a back facing away from the wind, the plenum configured to modulate air pressure variations on the outer side of the at least one joint in such a way that there is no entry of ambient air inside the nacelle or exit of nacelle air into the environment; and a variable air flow resistance device present at the outlet of the nacelle, the air flow resistance device configured to maintain a higher air pressure within the nacelle with respect to the outside of the nacelle at the at least one joint.

* * * * *